G. M. BAKER.
BAND BRAKE.
APPLICATION FILED SEPT. 13, 1911.
1,038,478.
Patented Sept. 10, 1912.
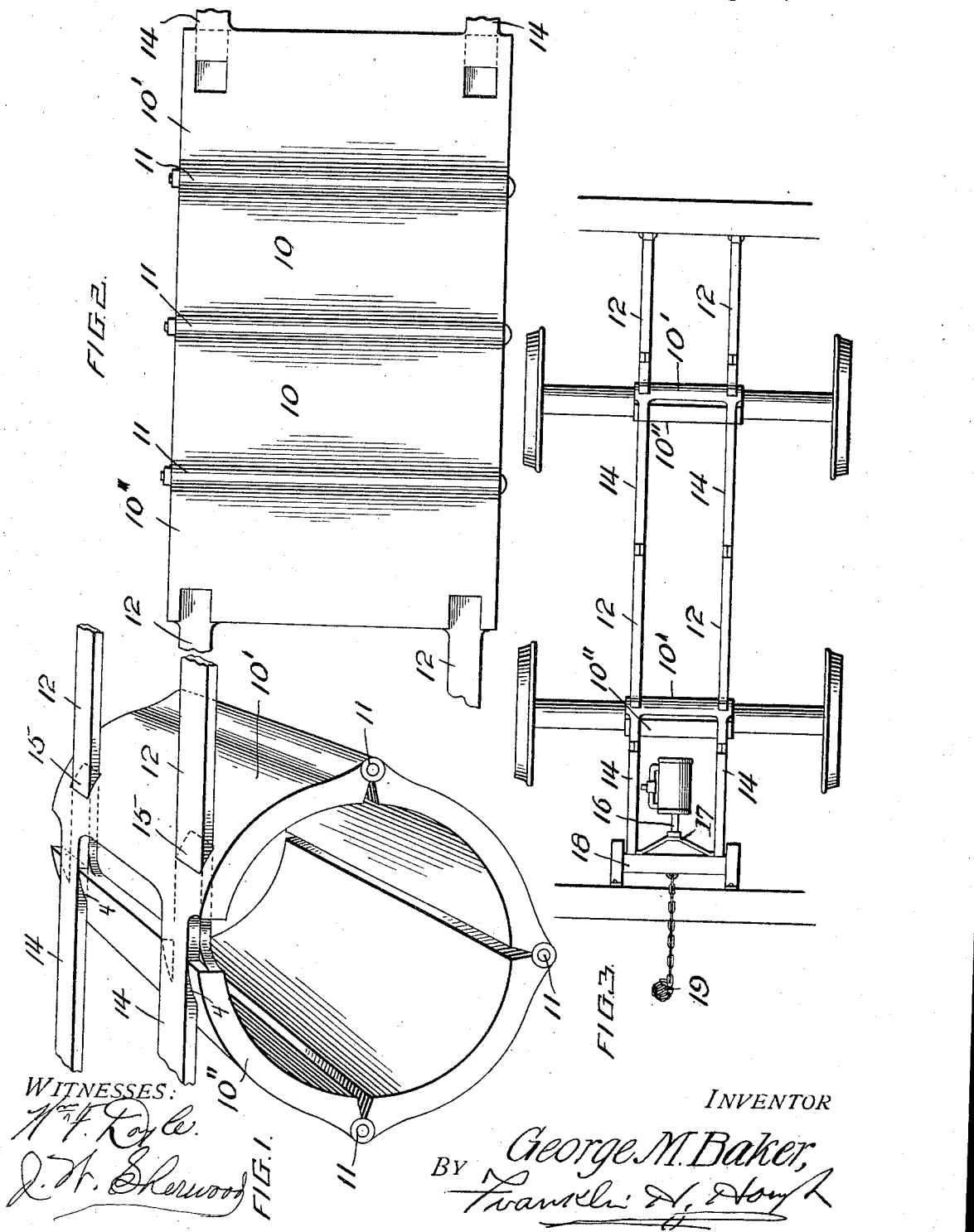
WITNESSES:
INVENTOR
George M. Baker,
BY
Attorney

UNITED STATES PATENT OFFICE.

GEORGE M. BAKER, OF BATH, NEW YORK.

BAND-BRAKE.

1,038,478.  Specification of Letters Patent. Patented Sept. 10, 1912.

Application filed September 13, 1911. Serial No. 649,053.

*To all whom it may concern:*

Be it known that I, GEORGE M. BAKER, a citizen of the United States, residing at Bath, in the county of Steuben and State of New York, have invented certain new and useful Improvements in Band-Brakes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a band brake for vehicles and is particularly adapted for application to the axle of railway cars.

The invention has for an object to provide a band brake formed in sections jointed together, so as to closely embrace the axle or under braking surface thereon and thus secure the maximum resistance against the momentum of vehicles.

Other and further objects and advantages of the invention will be hereinafter set forth and novel features thereof defined in the appended claim.

In the drawings:—Figure 1 is a perspective view of the brake. Fig. 2 is a view of the brake band as it would appear if unwound from the axle and in a flat position. Fig. 3 is a view showing the application of the brake to a truck.

Like numerals of reference refer to like parts of the several figures of the drawings.

The band brake is composed of a series of sections 10, 10' and 10", preferably one being connected to the other by a pivotal joint 11 and having their meeting edges beveled to permit a closing of the sections. Said section 10' has integral brake bars 14 projecting from one end thereof and designed to engage recesses formed adjacent to the free edge of the section 10". The section 10' is provided with openings 15 through which the brake bars 12 pass and are guided by the marginal edges of said openings. Said bars may be operated in any desired manner, for instance as shown in Fig. 3 where an air brake piston 16 is connected thereto at 17 by means of a cross bar 18 extending between the brake bars. The opposite brake bars may be fixed to any desired part in order to secure the desired resistance in the application of the brake. The brake may also be operated by a hand staff 19, having connection with the cross bar 18.

The invention presents a simple and efficient construction of band brake having sections which can be readily removed or replaced when worn or injured in use and is adapted to closely embrace a wheel axle or any brake surface thereon so as to form maximum resistance against further travel of the wheels. The parts of the sections may be made of any desired thickness and the number thereof varied to properly embrace the surface to which it is applied. The width of these sections may also be varied as found necessary in the practical application of the invention to cars, wagons or other vehicles for which it is adapted. The invention may also be applied in separate sections upon the same axle and the sections separately operated by any desired means.

Having thus described my invention and its merits, what I claim to be new is:—

A brake made up of a series of sections hinged together, one of said sections having recesses formed in the circumference thereof and extending through its free edge, integral bars projecting from said recessed section and beneath the recesses therein, the section at the other end of the series provided with holes to receive said integral bars, and bars projecting from said section having holes therein and extending through and guided in said recesses, as set forth.

In testimony whereof I hereunto affix my signature in the presence of two witnesses.

GEORGE M. BAKER.

Witnesses:
R. J. DAVISON,
ALLEN B. HILL.

---

Copies of this patent may be obtained for five cents each, by addressing the "Commissioner of Patents, Washington, D. C."